United States Patent
Panda et al.

(10) Patent No.: US 12,475,882 B2
(45) Date of Patent: Nov. 18, 2025

(54) METHOD AND SYSTEM FOR AUTOMATIC SPEECH RECOGNITION (ASR) USING MULTI-TASK LEARNED (MTL) EMBEDDINGS

(71) Applicant: Tata Consultancy Services Limited, Mumbai (IN)

(72) Inventors: Ashish Panda, Thane West (IN); Sunil Kumar Kopparapu, Thane West (IN); Aditya Raikar, Thane West (IN); Meetkumar Hemakshu Soni, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 231 days.

(21) Appl. No.: 18/448,628

(22) Filed: Aug. 11, 2023

(65) Prior Publication Data
US 2024/0071373 A1   Feb. 29, 2024

(30) Foreign Application Priority Data
Aug. 26, 2022   (IN) .............................. 202221048968

(51) Int. Cl.
*G10L 15/16*   (2006.01)
*G10L 15/20*   (2006.01)

(52) U.S. Cl.
CPC .............. *G10L 15/16* (2013.01); *G10L 15/20* (2013.01)

(58) Field of Classification Search
CPC ... G10L 15/16; G10L 15/20; G10L 2015/226; G10L 2015/227
USPC .................................................. 704/232, 251
See application file for complete search history.

(56) References Cited

U.S. PATENT DOCUMENTS

| | | | | |
|---|---|---|---|---|
| 10,347,241 B1 * | 7/2019 | Meng | ..................... | G10L 15/063 |
| 12,148,437 B2 * | 11/2024 | Sharma | ................... | G10L 19/02 |
| 2020/0312346 A1 * | 10/2020 | Fazeli | ..................... | G06N 3/044 |
| 2022/0199095 A1 * | 6/2022 | Chang | ..................... | G10L 17/06 |
| 2023/0260521 A1 * | 8/2023 | Slocum | ................... | G10L 17/04 |
| | | | | 704/232 |

(Continued)

OTHER PUBLICATIONS

Giri, Ritwik, et al. "Improving speech recognition in reverberation using a room-aware deep neural network and multi-task learning." 2015 IEEE International Conference on Acoustics, Speech and Signal Processing (ICASSP). IEEE, Aug. 2015, pp. 5014-5018. (Year: 2015).*

(Continued)

*Primary Examiner* — James S Wozniak
(74) *Attorney, Agent, or Firm* — FINNEGAN, HENDERSON, FARABOW, GARRETT & DUNNER LLP (57) ABSTRACT

State of the art Acoustic Models (AM), which are trained using data from one environment, may fail to adapt to another environment, and as a result, application is restricted. The disclosure herein generally relates to speech signal processing, and, more particularly, to a method and system for Automatic Speech Recognition (ASR) using Multi-task Learned Embeddings (MTL). In this approach, MTL embeddings are extracted from an MTL neural network that has been trained using feature vectors from a plurality of speech files. The MTL embeddings are then used for generating an acoustic model, which maybe then used for the purpose of Automatic Speech Recognition, along with the feature vectors and the MTL embeddings.

9 Claims, 3 Drawing Sheets

(56) References Cited

U.S. PATENT DOCUMENTS

2024/0005908 A1* 1/2024 Sharma .................. G10L 15/02

OTHER PUBLICATIONS

Ji, Xuan, et al. "Speaker-aware target speaker enhancement by jointly learning with speaker embedding extraction." ICASSP 2020-2020 IEEE International Conference on Acoustics, Speech and Signal Processing (ICASSP). IEEE, Apr. 2020, pp. 7294-7298. (Year: 2020).*

Khare, Aparna, et al. "Multi-modal embeddings using multi-task learning for emotion recognition." arXiv preprint arXiv:2009.05019. Sep. 2020, pp. 1-5. (Year: 2020).*

Kim, Suyoun, et al. "Environmental noise embeddings for robust speech recognition." arXiv preprint arXiv:1601.02553, Sep. 2016, pp. 1-5. (Year: 2016).*

Pironkov, Gueorgui, StÃ©phane Dupont, and Thierry Dutoit. "Speaker-aware multi-task learning for automatic speech recognition." 2016 23rd International Conference on Pattern Recognition (ICPR). IEEE, Dec. 2016, pp. 1-6. (Year: 2016).*

Raikar, Aditya, et al. "Acoustic Model Adaptation In Reverberant Conditions Using Multi-task Learned Embeddings." 2022 30th European Signal Processing Conference (EUSIPCO). IEEE, Sep. 2022, pp. 145-149. (Year: 2022).*

Tao, Fei, et al. "End-to-end audiovisual speech recognition system with multitask learning." IEEE Transactions on Multimedia 23, Feb. 2020, pp. 1-11. (Year: 2020).*

Zhou, Jianfeng, et al. "Training multi-task adversarial network for extracting noise-robust speaker embedding." ICASSP 2019-2019 IEEE International Conference on Acoustics, Speech and Signal Processing (ICASSP). IEEE, May 2019, pp. 1-5. (Year: 2019).*

Jain, Abhinav et al., "Improved Accented Speech Recognition Using Accent Embeddings and Multi-task Learning", Title of the item: Interspeech 2018, Date: Sep. 2-6, 2018, Publisher: IITB Link: https://www.cse.iitb.ac.in/~pjyothi/files/IS18b.pdf.

He, Weipeng et al., "Multi-task Neural Network for Robust Multiple Speaker Embedding Extraction", Title of the item: Interspeech 2021, Date: Aug. 30-Sep. 3, 2021, Publisher: ISCA, Link: https://www.idiap.ch/~odobez/publications/HeMotlicekOdobez-Interspeech2021-SpeakerEmbedding.pdf.

Li, Ke et al., "Speaker Adaptation for End-To-End CTC Models", Title of the item: 2018 IEEE Spoken Language Technology Workshop (SLT), Date: Jan. 4, 2019, Publisher: arXiv. Link: https://arxiv.org/pdf/1901.01239.pdf.

* cited by examiner

METHOD AND SYSTEM FOR AUTOMATIC SPEECH RECOGNITION (ASR) USING MULTI-TASK LEARNED (MTL) EMBEDDINGS

PRIORITY CLAIM

This U.S. patent application claims priority under 35 U.S.C. § 119 to: India Application No. 202221048968, filed on Aug. 26, 2022. The entire contents of the aforementioned application are incorporated herein by reference.

TECHNICAL FIELD

The disclosure herein generally relates to speech signal processing, and, more particularly, to a method and system for Automatic Speech Recognition (ASR) using Multi-task Learned Embeddings (MTL).

BACKGROUND

Acoustic environment plays a major role in the performance of a large-scale Automatic Speech Recognition (ASR) system. It becomes a lot more challenging when substantial amount of distortions, such as background noise and reverberations are present. Presence of the background noise and reverberations adversely affects quality of the speech recognition output and may in turn affect end applications.

Acoustic Model (AM) adaptation is an approach used for ASR. Many of the state of the art approaches use i-vectors for Acoustic Model (AM) adaptation. Embeddings from Single Task Learned (STL) neural network systems, such as x-vectors and r-vectors, have also been used to a varying degree of success. However, ASR models which are trained using data containing certain environmental and speaker characteristics may fail to adapt to other environmental and speaker characteristics and as a result, application is restricted.

SUMMARY

Embodiments of the present disclosure present technological improvements as solutions to one or more of the above-mentioned technical problems recognized by the inventors in conventional systems. For example, in one embodiment, a processor implemented method is provided. In this method, initially a plurality of speech files are received, via one or more hardware processors, as input data. Further, a plurality of feature vectors are extracted, via the one or more hardware processors, from the input data. Further, a multi-task learning (MTL) neural network is trained using one or more of the plurality of feature vectors, via the one or more hardware processors. Further, MTL embeddings are extracted from the MTL neural network, via the one or more hardware processors, wherein extracted MTL embeddings are encoded with a plurality of environmental parameters and a plurality of speaker parameters. Further, an acoustic model is generated, via the one or more hardware processors, by training a deep neural network with multi-task loss function, using the feature vectors and the MTL embeddings.

In another aspect, a transcript for an utterance from the acoustic model is decoded using feature vectors extracted from speech file and MTL embeddings.

In another aspect, a system is provided. The system includes one or more hardware processors, a communication interface, and a memory storing a plurality of instructions. The plurality of instructions when executed, cause the one or more hardware processors to receive a plurality of speech files as input data. Further, a plurality of feature vectors are extracted, via the one or more hardware processors, from the input data. Further, a multi-task learning (MTL) neural network is trained using one or more of the plurality of feature vectors, via the one or more hardware processors. Further, MTL embeddings are extracted from the MTL neural network, via the one or more hardware processors, wherein extracted MTL embeddings are encoded with a plurality of environmental parameters and a plurality of speaker parameters. Further, an acoustic model is generated, via the one or more hardware processors, by training a deep neural network with multi-task loss function, using the feature vectors and the MTL embeddings.

In another aspect, the system decodes a transcript for an utterance from the acoustic model using feature vectors extracted from speech file and MTL embeddings.

In yet another aspect, a non-transitory computer readable medium is provided. The non-transitory computer readable medium includes a plurality of instructions, which when executed, cause one or more hardware processors to execute the following steps. Initially a plurality of speech files are received, as input data. Further, a plurality of feature vectors are extracted, via the one or more hardware processors, from the input data. Further, a multi-task learning (MTL) neural network is trained using one or more of the plurality of feature vectors, via the one or more hardware processors. Further, MTL embeddings are extracted from the MTL neural network, via the one or more hardware processors, wherein extracted MTL embeddings are encoded with a plurality of environmental parameters and a plurality of speaker parameters. Further, an acoustic model is generated, via the one or more hardware processors, by training a deep neural network with multi-task loss function, using the feature vectors and the MTL embeddings.

In another aspect, the non-transitory computer readable medium configures the one or more hardware processors to decode a transcript for an utterance from the acoustic model using feature vectors extracted from speech file and MTL embeddings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Acoustic Model (AM) adaptation is an approach used for ASR. Many of the state of the art approaches use i-vectors for Acoustic Model (AM) adaptation. Embeddings from Single Task Learned (STL) neural network systems, such as x-vectors and r-vectors, have also been used to a varying degree of success. Disadvantages of these systems is that the single task learned embeddings are trained to encode information from only one task and thus their ability to adapt the acoustic model to different environmental and speaker characteristics is limited.

To address these challenges, the method and system disclosed in the embodiments herein provide a Multi-Task Learned Embeddings (MTL) based Automatic Speech Recognition (ASR) approach. In this approach, the system extracts the MTL embeddings from an MTL neural network which is trained using feature vectors extracted from a plurality of speech signals received as input data. Further, an acoustic model is generated by training a deep neural network with multi-task loss function, using the feature vectors and the MTL embeddings. The feature vectors and the MTL embeddings are further used for decoding a transcript for an utterance from the acoustic model.

Figure 1:
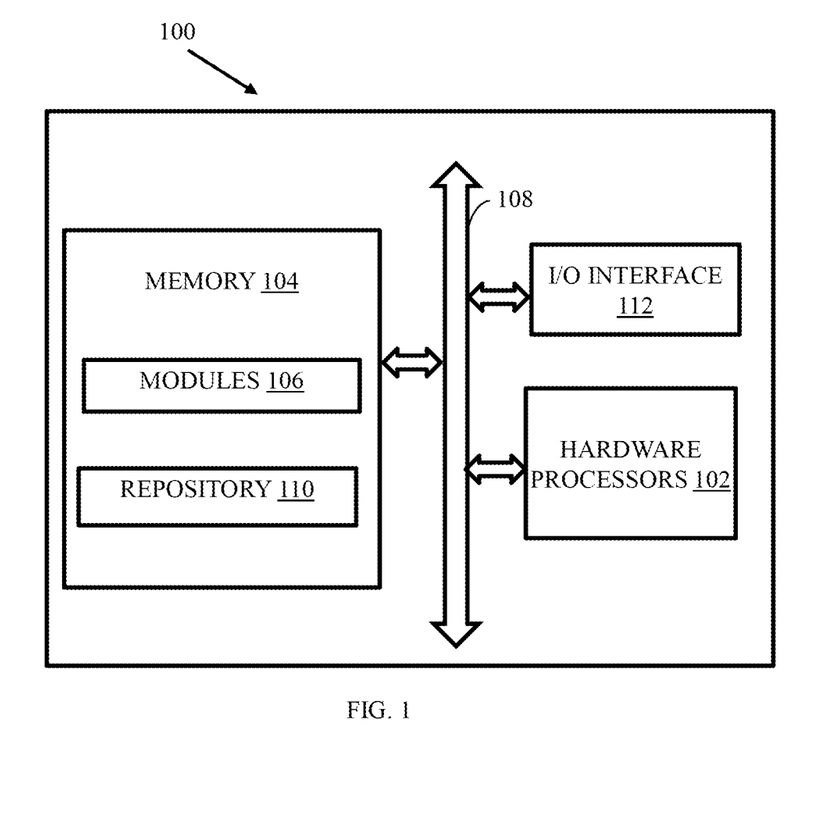
FIG. 1 illustrates an exemplary system for generating an acoustic model for Multi-Task Learned Embeddings (MTL) based Automatic Speech Recognition (ASR), according to some embodiments of the present disclosure.
Figure 2:
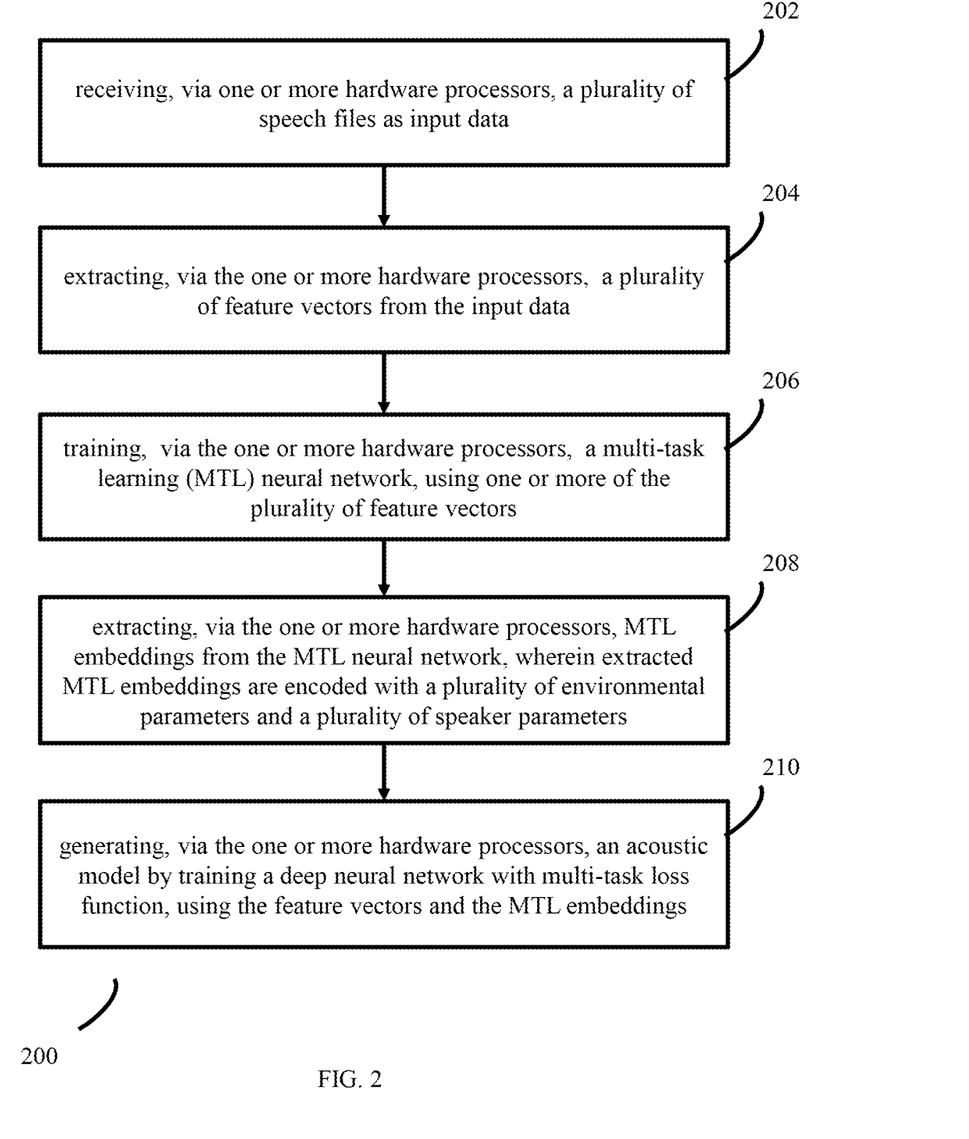
FIG. 2 is a flow diagram depicting steps involved in the process of MTL based Automatic Speech Recognition (ASR), using the system of FIG. 1, according to some embodiments of the present disclosure.
Figure 3:
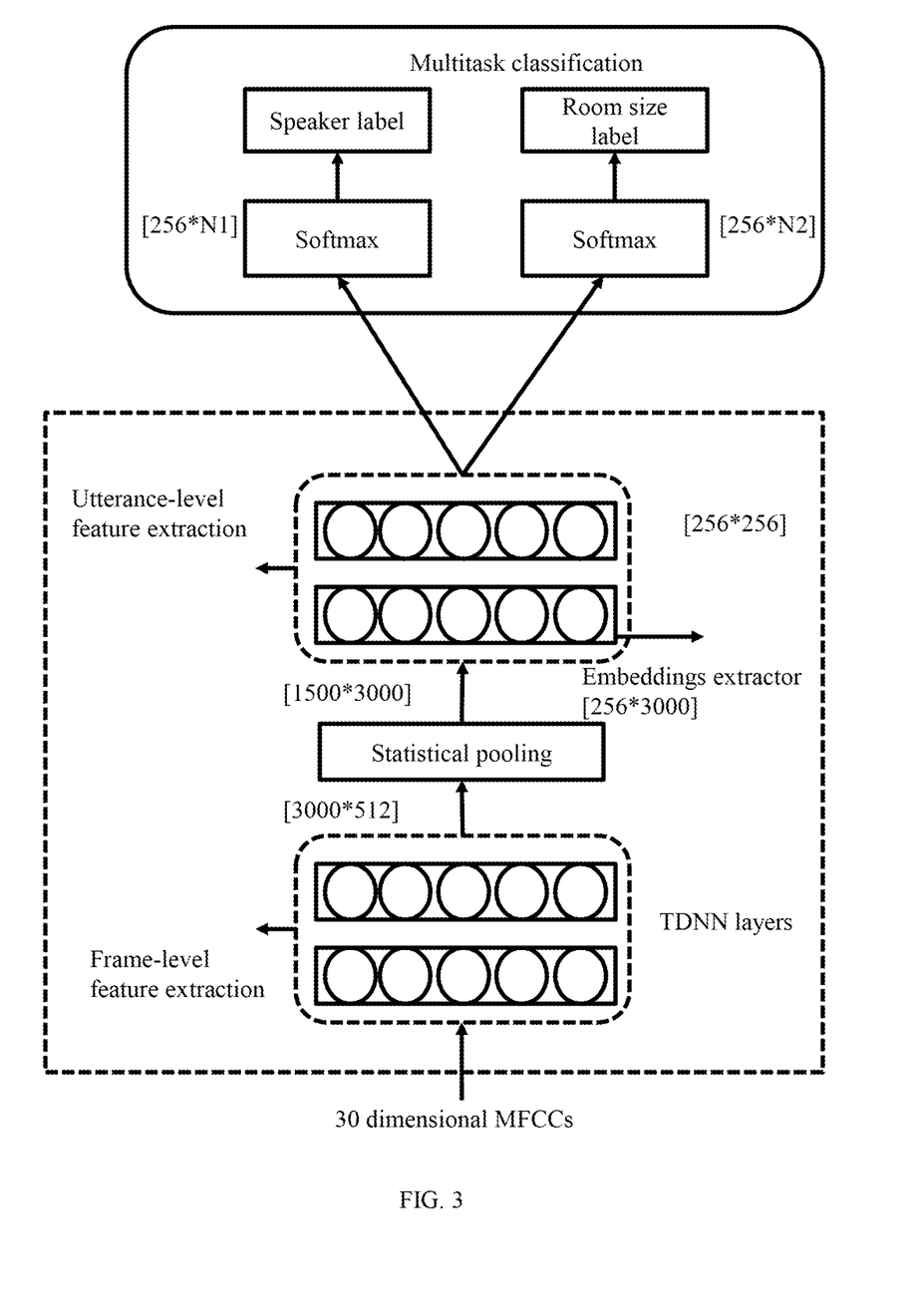
FIG. 3 illustrates an architecture used by the system of FIG. 1, for extraction of MTL embeddings, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary system for generating an acoustic model for Multi-Task Learned Embeddings (MTL) based Automatic Speech Recognition (ASR), according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of MTL based Automatic Speech Recognition (ASR), being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the MTL based Automatic Speech Recognition (ASR).

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagram in FIG. 2.

FIG. 2 is a flow diagram depicting steps involved in the process of MTL based Automatic Speech Recognition (ASR), using the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1, the steps of flow diagram as depicted in FIG. 2, and the example architecture in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 receives, via one or more hardware processors, a plurality of speech files as input data. In an embodiment, the input data maybe fed to the system 100 by a user, using a suitable user interface. In another embodiment, the system 100 may capture, in real-time, speech signals from an environment, using appropriate sensors. Further, at step 204 of the method 200, the system 100 extracts, via the one or more hardware processors, a plurality of feature vectors from the input data. For example, the feature vectors extracted maybe log-mel-filter values.

Further, at step 206 of the method 200, the system 100 trains, via the one or more hardware processors, a multi-task learning (MTL) neural network, using one or more of the plurality of feature vectors. The system 100 may use any standard machine learning based approach for training the MTL neural network. The MTL neural network, once trained, may be able to process a speech signal input and extract one or more relevant information from the speech signal input. For example, the MTL neural network may classify a room in which one or more speakers are present, from whom the plurality of speech signals are being received as one of large, small and medium. The MTL neural network may also be able to obtain a noise information comprising Signal to Noise Ratio (SNR) from the speech signal. The room specific information, the noise information, and any other data which is related to environment from which the speech signals are received, are labeled as environmental parameters. Similarly, the MTL neural network may identify speaker specific information such as but not limited to, speaker identity, gender, and age, by processing the speech signal, and the speaker specific data is labeled as speaker parameters.

Further, at step 208 of the method 200, the system 100 extracts, via the one or more hardware processors, MTL embeddings from the MTL neural network, wherein extracted MTL embeddings are encoded with a plurality of the environmental parameters and a plurality of the speaker parameters. The MTL embeddings are extracted from a hidden layer and encode various information including the plurality of the environmental parameters and the plurality of the speaker parameters, that can aid in acoustic model performance.

An example architecture that may be used by the system 100 for the MTL embeddings extraction is depicted in FIG. 3. In this example implementation, this architecture collects 30 dimensional Mel-frequency cepstral coefficients (MFCCs) data as input, and initially performs frame-level extraction using a plurality of Time delay neural network (TDNN) layers. Output of the plurality of TDNN layers is then subject to statistical pooling, before performing an utterance level feature extraction. Output of the utterance level feature extraction is then processed using softmax layers to obtain a speaker label and a room size label.

Further, at step 210 of the method 200, the system 100 generates, via the one or more hardware processors, an acoustic model by training a deep neural network with multi-task loss function, using the feature vectors and the MTL embeddings. In order to generate the acoustic model, the system 100 stacks traditional features such as the maybe log-mel-filter values with the MTL embeddings from same utterance, and uses this data as input for the acoustic model training.

The acoustic model, along with the feature vectors and the MTL embeddings, may be then used for processing acoustic signals for the speech recognition, to decode corresponding transcript for each utterance in the acoustic signals.

Experimental Data:
a. Experimental Setup
a. MTL Embedding Extractor

In order to train a classifier, a mix of unaugmented (anechoic) and reverberation augmented version of Full Libripseech data was constructed. The data was approximately 960 hours long and there are total 2338 speakers. To construct reverberant classes, 80% of the total simulated Room Impulse Responses (RIRs) were taken from available sources for reverberant augmentation which have been labelled as small, medium and large, based on the room size. In addition to it, anechoic class was added to the 4 room size labels. A training set was constructed by sampling each utterance to be from an anechoic, small, medium or large room with equal probability. Test set was also prepared, which was a mix of anechoic and reverberated version of the Librispeech test-clean. It was ensured that the simulated RIRs used in the test sets were different from that used in the training sets. All the networks were trained for 100,000 iterations on 350 frames of MFCCs with 30-dimension. The batch size was set as 500 and a small held out set of training utterances is kept for validation. Stochastic gradient descent with learning rate 0.2 was used, along with 0.5 momentum.

b. ASR systems

All experiments were conducted using ASR models trained on Librispeech. Initial experiments use reverberation augmented version of Librispeech 100 hours subset. The best combinations obtained from this 100 hours subset were then tested on the full Librispeech 960 hours dataset with reverberation augmentation. The simulated RIR set used to augment both Librispeech 100 and 960 hours respectively, was same as the test RIR set used to evaluate MTL embedding extractor. For evaluation of trained models, test-clean and test-other subsets of Librispeech were used.

In order to evaluate the effectiveness of room acoustic based AM adaptation, reverberated sets from test-clean and test-other are prepared. For this purpose, real RIRs were used, which included 271 from MIT impulse response survey, 188 from voiceHome, 2325 from another reference database, and 327 from other similar reference databases. Since total number of real RIRs were greater than utterances in test-clean and test-other, 3 different rev sets were made for each respectively. The naming convention followed for such set was {ftest-c-rev-set-#, test-o-rev-set-#}—{#=1,2,3} for reverberated Librispeech test-clean and test-other set respectively. Results consisted of 13.4 hours clean speech utterances taken from Aurora-4 which were recorded in 20 different highly reverberant real environments, with different reflection coefficients and speaker-microphone pair distances.

All ASR systems were trained using default kaldi recipes. For Librispeech train-clean-100 set, kaldi Librispeech recipe 2 was used, which was then modified as follows. Hidden Markov Model (HMM)—Gaussian Mixture Model (GMM) system was trained till trio using 100h subset and use it to obtain alignments of training data. Then default chain recipe was used to extract high-resolution MFCC features, train i-vector extractor and i-vector extraction, and perform AM training using Lattice-Free Maximum Mutual Information (LF-MMI) objective. The recipe was modified to use single GPU and train the network for 4 epochs. For Librispeech 960h dataset, Kaldi default recipe was used without cleanup part. Training was done using 2 parallel jobs on two GPUs, while keeping all other parameters same. During decoding, available standard Language Models (LM) were used for each task. For Librispeech evaluation subsets, small 3-gram LM was used and the lattices generated were rescored using large 4-gram LM.

2. Results

A. Experiments on 100 Hour Subset of Librispeech

The experimental results reported in Table I provide an insight into the performance of various embeddings in reverberated conditions. 100 dimensional i-vectors were used to set a baseline, extracted in online manner during both training and decoding, which is standard in Kaldi recipes. The x-vectors, r-vectors and the MTL-embeddings were all of 256 dimensions. It can observed that for reverberated speech, x-vector performs better than i-vector and r-vector performs better than both. However, the MTL-embeddings based approach in method 200 perform the best irrespective of the weight assigned to speaker information loss and room size loss. Out of the three sets of weights tested, assigning weights 0.1 to speaker information loss and 1 to room size loss provided the best performance resulting in 1% absolute performance gain over the r-vectors. The weights assigned in the loss function suggest that room size information is more important for performance of ASR systems in the case of reverberated speech. However, the fact that MTL-embeddings provide similar performance to i-vector and x-vector adaptation in test-clean condition suggests that there is no performance lose because of lesser assigned weight to speaker information in the loss function.

TABLE 1

Results (% WER) of online i-vector, x-vector, r-vector and the proposed MTL embedding for various reverberated conditions. MTL(w1, w2) signifies assignment of weight w1 for speaker information loss and w2 for room size loss.

Test data WER (in %)

| Embedding | Test-clean | Test-c-rev-set-1 | Test-c-rev-set-2 | Test-c-rev-set-2 | Avg. test-rev |
|---|---|---|---|---|---|
| i-vector | 5.43 | 31.12 | 32.69 | 32.01 | 32.94 |
| x-vector | 5.46 | 28.76 | 30.81 | 30.08 | 29.88 |
| r-vector | 5.49 | 28.16 | 30.09 | 29.57 | 29.54 |
| MTL (1, 0.1) | 5.42 | 27.87 | 29.78 | 29.36 | 29.00 |
| MTL (1.1) | 5.46 | 27.47 | 29.63 | 29.41 | 28.83 |
| MTL(0.1, 1) | 5.42 | 27.26 | 29.32 | 29 | 28.52 |

TABLE 2

Results (% WER) of various fusion techniques. X-vectors, r-vectors and the proposed embeddings were stacked with online i-vectors for AM adaptation. MTL(w1, w2) signifies assignment of weight w1 for speaker information loss and w2 for room size loss.

Test data WER (in %)

| Embedding | Test-clean | Test-c-rev-set-1 | Test-c-rev-set-2 | Test-c-rev-set-2 | Avg. test-rev |
|---|---|---|---|---|---|
| i-vector | 5.43 | 31.12 | 32.69 | 32.01 | 31.94 |
| i-vector + x-vector | 5.23 | 27.85 | 29.39 | 28.95 | 28.73 |
| i-vector + r-vector | 5.37 | 28.04 | 30.02 | 29.41 | 29.15 |
| i-vector + MTL (1, 0.1) | 5.18 | 26.75 | 28.95 | 28.12 | 27.94 |
| i-vector + MTL(1, 1) | 5.29 | 26.62 | 28.51 | 28.15 | 27.72 |
| i-vector + MTL(0.1, 1) | 5.3 | 27.03 | 29.11 | 28.83 | 28.32 |

The next set of experiments explored possibility of fusion with online i-vectors. Table 2 tabulates the results from experiments where x-vectors, r-vectors and the MTL embeddings based approach in method 200 were stacked with i-vectors for AM adaptations. Such fusion techniques invariably improved the performance over online i-vectors. It seems to suggest that i-vectors alone may not be sufficient for AM adaptations in reverberated conditions. While r-vectors provided better performance than x-vectors on their own (Table. 1), they were found to have comparatively lesser performance in fusion. Stacking x-vectors with i-vectors resulted in an average WER of 28.73% in reverberated conditions while stacking r-vectors with i-vectors resulted in 29.15%. This shows that x-vectors compliment i-vectors better than r-vectors. The MTL embeddings based approach in method 200, however, comfortably outperformed both other fusion schemes. The MTL embeddings with equal weights to speaker information and room size loss was the best performer when fused with i-vectors. This fusion resulted in a relative performance gain of 13.27% over i-vector alone and 3.5% relative improvement over i-vector and x-vector fusion. Though the weights assigned to individual task loss is important, it is noteworthy that all three selected weights outperform x-vectors and r-vectors. Another observation is, although the training of MTL embedding extractor and AM adaptation is done using simulated RIRs, still with the help of this information it is able to perform quite good on disjoint real RIR test set, and outperform i-vector by a significant margin.

B. Multi-Task Learning Vs Single-Task Learning

In the MTL-embedding based approach in method 200, the network is trained to learn two tasks, speaker identity and room-size, with certain weights assigned to the loss from each task. If the weight of the loss from room-size is set to zero, then the MTL-embedding is akin to x-vector. If the weight from the speaker identity is set to zero, then the proposed embedding is akin to r-vector. Therefore, it would be interesting to see whether multi-task embedding has any advantage over multiple single task embedding stacked together. Table. 3 presents the results from our experiments exploring this. It can be seen that the MTL-embeddings outperformed the stacked STL embeddings. It seems to suggest that the MTL-embeddings were better able to encode various aspects of the speech than STL embeddings taken together. Comparing results of stacked single task embeddings in Table.3 with the performance of MTL embeddings reported in Table. 2, it can be observed that the stacked STL embeddings do not outperform the MTL embeddings, irrespective of the weights given to individual task loss, which underlines the advantage of multi-task learning for AM adaptations.

TABLE 3

Results (% WER) for experiments comparing stacked x-vector and r-vector and MTL-embeddings. Stacked STL stands for i-vector + x-vector + r-vector and MTL(w1, w2) signifies assignment of weight w1 for speaker information loss and w2 for room size loss
Test data WER (in %)

| Embedding | Test-clean | Test-c-rev-set-1 | Test-c-rev-set-2 | Test-c-rev-set-2 | Avg. test-rev |
|---|---|---|---|---|---|
| i-vector | 5.43 | 31.12 | 32.69 | 32.01 | 31.94 |
| Stacked STL | 5.36 | 26.93 | 29.95 | 28.68 | 28.52 |
| i-vector + MTL(1, 1) | 5.29 | 26.62 | 28.51 | 28.15 | 27.72 |

C. Experiments on Librispeech 960h data

1) Results on RIR augmented Librispeech Test Set:

In this experiment, performance of the MTL embeddings based approach was evaluated on full Librispeech 960h dataset. The analysis on the smaller Librispeech 100h data showed that fusion of i-vector and other embeddings provided the best improvements. Also, it was shown that MTL(1,1) provided the best performance when used alongside i-vectors for AM adaptations. Therefore, three systems were compared on the larger Librispeech 960h hours data: i-vector+r-vector, i-vector+x-vector and ivector+MTL(1,1). Experiments were conducted on the reverberated versions of both test-clean and test-other set. Table. 4 presents the results for reververated test-clean data while Table. 5 presents the same for reverberated test-other data.

It can be observed that the results follow the same trend as in the case of Librispeech 100h training data subset. In both reverberated test-clean and test-other data, the MTL-embeddings based approach provide superior performance reducing the WER by 10.9% and 8.7% relative to i-vector on test-clean and test-other data respectively. Over the stacked i-vectors and r-vectors, the relative reduction in WER are 6.8% and 5.0% on test-clean and test-other data respectively.

TABLE 4

Results (% WER) for experiments on full Librispeech 960 h training data and reverberated test-clean set. MTL(w1, w2) signifies assignment of weight w1 for speaker information loss and w2 for room size loss
Test data WER (in %)

| Embedding | Test-clean | Test-c-rev-set-1 | Test-c-rev-set-2 | Test-c-rev-set-2 | Avg. test-rev |
|---|---|---|---|---|---|
| i-vector | 4.06 | 21.11 | 22.86 | 22.57 | 22.18 |
| i-vector + r-vector | 3.98 | 20.08 | 21.89 | 21.55 | 21.17 |
| i-vector + x-vector | 3.87 | 19.25 | 21.16 | 20.82 | 20.41 |
| i-vector + MTL(1, 1) | 3.97 | 18.70 | 20.31 | 20.21 | 19.74 |

TABLE 5

Results (% WER) for experiments on full Librispeech 960 h training data and reverberated test-other set. MTL(w1, w2) signifies assignment of weight w1 for speaker information loss and w2 for room size loss
Test data WER (in %)

| Embedding | Test-clean | Test-c-rev-set-1 | Test-c-rev-set-2 | Test-c-rev-set-2 | Avg. test-rev |
|---|---|---|---|---|---|
| i-vector | 9.68 | 36.28 | 35.17 | 35.93 | 35.79 |
| i-vector + r-vector | 9.54 | 35.19 | 33.50 | 34.55 | 34.41 |
| i-vector + x-vector | 9.44 | 33.92 | 32.59 | 33.53 | 33.34 |
| i-vector + MTL(1, 1) | 9.40 | 33.17 | 31.84 | 33.05 | 32.68 |

D. Experiments on HRRE Test Data

Results on HRRE test set, contains real reverberant speech data. The dataset comes with 20 real recorded reverberant test sets with different reflection coefficients and speaker-microphone pair. The final results shown for each experiment on HRRE is the average across all the 20 test sets. Performance of the MTL embeddings based approach in method 200 with Librispeech 100h and 960h models were compared.

1) Results using Librispeech 100h Model: Table. 6 and Table. 7 present the WERs from the experiments conducted using model trained on Librispeech 100 hours. It was observed what combination of weights: w1 and w2 of MTL(w1, w2) embeddings works best on HRRE test set. It was observed that out of the three sets of weights w1,w2= (1,1) provides the best performance, which is in line with the trend observed on artificially reverberated Librispeech test set. Further we compared the best performing set of weights: w1,w2=(1,1) and compared with x-vector and r-vector, and here too we see that MTL(1,1) outperform others significantly.

TABLE 6

Results (% WER) for experiments on HRRE dataset tested with Librispeech 100 h model. MTL(w1, w2) signifies assignment of weight w1 for speaker information loss and w2 for room size loss
HRRE Test Data

| Embeddings | i-vector | i-vector + MTL(1, 0.1) | i-vector + MTL(0.1, 1) | i-vector + MTL(1, 1) |
|---|---|---|---|---|
| WER | 25.16 | 23.71 | 23.48 | 22.91 |

TABLE 7

Results (% WER) for experiments on HRRE dataset tested with Librispeech 100 h model. MTL(w1, w2) signifies assignment of weight w1 for speaker information loss and w2 for room size loss
HRRE Test Data

| Embeddings | i-vector | i-vector + x-vector | i-vector + r-vector | i-vector + MTL(1, 1) |
|---|---|---|---|---|
| WER | 25.16 | 23.99 | 24.08 | 22.91 |

2) Results using Librispeech 960h Model: Table. 8 presents the results of HRRE data tested with Librispeech 960h model. It was observed that the trend seen in artificially reverberated Librispeech data is replicated, with the MTL embeddings based approach outperforming others. It is noteworthy that the r-vector is not performing as well as the x-vector and the MTL embeddings based approach. In fact, out of the 20 different sub-sets in HRRE, the proposed method outperforms the r-vector in all the subsets, but 1.

TABLE 8

Results (% WER) for experiments on HRRE dataset tested with Librispeech 960 h model. MTL(w1, w2) signifies assignment of weight w1 for speaker information loss and w2 for room size loss.
HRRE Test Data

| Embeddings | i-vector | i-vector + x-vector | i-vector + r-vector | i-vector + MTL(1, 1) |
|---|---|---|---|---|
| WER | 18.81 | 17.88 | 18.35 | 17.58 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of domain adaptation in Automatic Speech Recognition (ASR) systems. The embodiment, thus provides a Multi-Task Learned Embeddings (MTL) based ASR approach.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, a plurality of speech files signals as input data;
   extracting, via the one or more hardware processors, a plurality of feature vectors from the input data;
   training, via the one or more hardware processors, a multi-task learning (MTL) neural network, using one or more of the plurality of feature vectors, wherein the trained MTL neural network able to perform: process the speech signals and extract one or more information from the speech signals, classify a room in which one or more speakers are present from whom the speech signals are being received;
   extracting, via the one or more hardware processors, MTL embeddings from the MTL neural network, wherein extracted MTL embeddings are encoded with a plurality of environmental parameters and a plurality of speaker parameters, wherein the plurality of environmental parameters comprises information on classification of the room as one of large, small and medium as identified by the MTL neural network, and a noise information comprising a Signal to Noise Ratio (SNR), wherein the MTL embeddings are extracted by: initially performing frame-level features extraction using a plurality of Time delay neural network (TDNN) layers, further output of the plurality of TDNN layers is subjected to statistical pooling before performing an utterance level feature extraction and output of the utterance level feature extraction is processed using a plurality of softmax layers to obtain a speaker label and a room size label;
   generating, via the one or more hardware processors, an acoustic model by training a deep neural network with a multi-task loss function, using the feature vectors and the MTL embeddings; and
   decoding a transcript for an utterance from the acoustic model using the feature vectors extracted from the plurality of speech signals and the MTL embeddings.

2. The processor implemented method of claim 1, wherein the input data is received using an interface or received in real-time as speech signals from an environment using sensors.

3. The processor implemented method of claim 1, wherein the plurality of speaker parameters comprise speaker identity, gender, and age.

4. A system, comprising:
one or more hardware processors;
a communication interface; and
a memory storing a plurality of instructions, wherein the plurality of instructions when executed, cause the one or more hardware processors to:
receive a plurality of speech signals as input data;
extract a plurality of feature vectors from the input data;
train a multi-task learning (MTL) neural network, using one or more of the plurality of feature vectors, wherein the trained MTL neural network able to perform: process the speech signals and extract one or more information from the speech signals, classify a room in which one or more speakers are present from whom the speech signals are being received;
extract MTL embeddings from the MTL neural network, wherein extracted MTL embeddings are encoded with a plurality of environmental parameters and a plurality of speaker parameters, wherein the plurality of environmental parameters comprises information on classification of the room as one of large, small and medium as identified by the MTL neural network, and a noise information comprising a Signal to Noise Ratio (SNR), wherein the MTL embeddings are extracted by: initially performing frame-level features extraction using a plurality of Time delay neural network (TDNN) layers, further output of the plurality of TDNN layers is subjected to statistical pooling before performing an utterance level feature extraction and output of the utterance level feature extraction is processed using a plurality of softmax layers to obtain a speaker label and a room size label;
generate an acoustic model by training a deep neural network with a multi-task loss function, using the feature vectors and the MTL embeddings; and
decoding a transcript for an utterance from the acoustic model using the feature vectors extracted from the plurality of speech signals and the MTL embeddings.

5. The system of claim 4, wherein the one or more hardware processors are further configured to receive the input data using an interface or received in real-time as speech signals from an environment using sensors.

6. The system of claim 4, wherein the one or more hardware processors are configured to obtain information on speaker identity, gender, and age as the plurality of speaker parameters.

7. One or more non-transitory machine-readable information storage mediums comprising one or more instructions which when executed by one or more hardware processors cause:
receiving a plurality of speech signals as input data;
extracting a plurality of feature vectors from the input data;
training a multi-task learning (MTL) neural network, using one or more of the plurality of feature vectors, wherein the trained MTL neural network able to perform: process the speech signals and extract one or more information from the speech signals, classify a room in which one or more speakers are present from whom the speech signals are being received;
extracting MTL embeddings from the MTL neural network, wherein extracted MTL embeddings are encoded with a plurality of environmental parameters and a plurality of speaker parameters, wherein the plurality of environmental parameters comprises information on classification of the room as one of large, small and medium as identified by the MTL neural network, and a noise information comprising a Signal to Noise Ratio (SNR), wherein the MTL embeddings are extracted by: initially performing frame-level features extraction using a plurality of Time delay neural network (TDNN) layers, further output of the plurality of TDNN layers is subjected to statistical pooling before performing an utterance level feature extraction and output of the utterance level feature extraction is processed using a plurality of softmax layers to obtain a speaker label and a room size label;
generating an acoustic model by training a deep neural network with a multi-task loss function, using the feature vectors and the MTL embeddings; and
decoding a transcript for an utterance from the acoustic model using the feature vectors extracted from the plurality of speech signals and the MTL embeddings.

8. The one or more non-transitory machine-readable information storage mediums of claim 7, further comprising receiving the input data using an interface or received in real-time as speech signals from an environment using sensors.

9. The one or more non-transitory machine-readable information storage mediums of claim 7, wherein the plurality of speaker parameters comprise speaker identity, gender, and age.

* * * * *